(12) United States Patent
Yang

(10) Patent No.: US 7,710,880 B2
(45) Date of Patent: May 4, 2010

(54) METHOD AND APPARATUS FOR SECURITY PROTECTION OF SERVICE INTERRUPTION IN SWITCH NETWORK

(75) Inventor: Shaoming Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 668 days.

(21) Appl. No.: 11/618,597

(22) Filed: Dec. 29, 2006

(65) Prior Publication Data

US 2007/0217342 A1   Sep. 20, 2007

(30) Foreign Application Priority Data

Mar. 16, 2006   (CN) .................. 2006 1 0065066

(51) Int. Cl.
*H04L 1/00*   (2006.01)
(52) U.S. Cl. .................. 370/237; 370/389; 370/401; 370/465
(58) Field of Classification Search ........................ None
See application file for complete search history.

(56) References Cited

U.S. PATENT DOCUMENTS

| | | | | |
|---|---|---|---|---|
| 6,614,781 | B1 * | 9/2003 | Elliott et al. | 370/352 |
| 6,950,441 | B1 * | 9/2005 | Kaczmarczyk et al. | 370/467 |
| 7,023,794 | B2 * | 4/2006 | Khan et al. | 370/219 |
| 7,023,977 | B2 * | 4/2006 | Copley | 379/221.03 |

FOREIGN PATENT DOCUMENTS

| | | |
|---|---|---|
| CN | 1423876 A | 6/2003 |
| JP | 2000-49862 | 2/2000 |
| JP | 2001-53876 | 2/2001 |
| JP | 2005-6178 | 1/2005 |

OTHER PUBLICATIONS

Lakshmi-Ratan, the Lucent Technologies Softswitch-Realizing the Promise of Convergence, Bell Labs Technical Journal, 22 pages, Apr.—Jun. 1999.*

* cited by examiner

*Primary Examiner*—Frank Duong
(74) *Attorney, Agent, or Firm*—Finnegan, Henderson, Farabow, Garrett & Dunner LLP

(57) ABSTRACT

Embodiments of the present invention provide a security protection method and apparatus for performing security protection during service interruption occurring in a switch network. In an embodiment of the present invention, a transmitting-end device selects each sub-route from a plurality of sub-routes one by one to transmit a call to an opposite-end device; when a trunk device receives the call, it analyzes a route condition from the current selected sub-route to an opposite-end device; the trunk device determines whether to transmit the call to the opposite-end device or report a blocking message to the transmitting-end device according to the route condition; if the transmitting-end device receives the blocking message, then the transmitting-end device excludes the current selected sub-route, judges whether all the sub-routes are excluded, and determines whether to continue selecting a next sub-route or end selecting the sub-routes according to the judgment result.

21 Claims, 8 Drawing Sheets

METHOD AND APPARATUS FOR SECURITY PROTECTION OF SERVICE INTERRUPTION IN SWITCH NETWORK

The present application claims priority from Chinese patent application No. 200610065066.4 entitled "Method and Apparatus for Security Protection of Service Interruption in Switch Network" filed with the State Intellectual Property Office of China on Mar. 16, 2006, the entirety of which is incorporated by reference herein.

FIELD OF THE INVENTION

The present invention relates to the field of communication technology, and more particularly, to a security protection method and apparatus for performing security protection during service interruption occurring in a switch network.

BACKGROUND OF THE INVENTION

The services provided by the current telecommunication network are become more and more integrated, and with the higher and higher integration ability of telecommunication equipment, call loss of large area may occur once any abnormity appears in the equipment, therefore, the secure and reliable operation of the network becomes very important.

In the current switch network, a service and switch unit includes a switch, an SS (Soft Switch), an SCP (Service Control Point), and an AS (Application Server). Since the covering area is large, the secure intercommunication between the soft switch and the other network elements has become a problem that both the operators and the manufacturers focus on. Now, there are various solutions for the secure intercommunications between the soft switch and the smart network SCP, and between the soft switch and the AS.

In a first-class toll network constituted by soft switches, there are particular requirements for the security problem of the communication between soft switches due to the particularity of the network.

FIG. 1 shows a network topological graph of a first-class toll network constituted by soft switches in the prior art A soft switch SS1, and a soft switch SS2-1 and a soft switch SS2-2 are respectively located in different provinces, the soft switch SS1 centrally connects calls in a large district 1 (a plurality of provinces constituting a large district), the soft switch SS2-1 and the soft switch SS2-2 centrally connect calls in a large district 2; the soft switch SS1 and the soft switch SS2-1 and the soft switch SS2-2 are interconnected, each of which has a TMG (Trunk Media Gateway), i.e., TMG1, TMG2-1, and TMG2-2, respectively.

FIG. 2 shows a network topological graph of another first-class toll network constituted by soft switches in the prior art A soft switch SS1, and a soft switch SS2-1 and a soft switch SS2-2 are respectively located in different provinces, the soft switch SS1 centrally connects calls in a large district 1, and the soft switch. SS2-1 and the soft switch SS2-2 centrally connect calls in a large district 2; the soft switch SS1 and the soft switches SS2-1 and SS2-2 are interconnected, and the two soft switches SS2-1 and SS2-2 in the large district 2 only have one TMG2-1.

As illustrated in FIG. 1 and FIG. 2, since the traffics centrally connected by respective soft switches are quite high, in the case that fewer TMGs are configured, it should be ensured that tee tandem between the large districts will not be influenced when a TMG fails.

Please refer to FIG. 3 as well, which shows a secure intercommunication solution between soft switches in the prior art.

In this prior art the backup disaster-recovery of the core routing device is realized by a router 301 and a router 302, that is, the two first sub-routes are backups in terms of physical device. Furthermore, in the case of the interruption of the direct routes (i.e. the first sub-routes) of the two soft switches SS1 and SS2, a call is transferred to a switch 304 via a second sub-route.

That is to say, the disaster recovery solutions for solving the service interruption between soft switches at present have two strategies: (1) disaster recovery is realized by network equipment; and (2) in the case of the failure of all network equipments, a call is guaranteed to be normal by a second sub-route. In particular; the strategy 1 is to perform the backup disaster-recovery by hardware, the soft switch provides an IP interface through an interface board of primary backup or load sharing, and the bearer network accesses the soft switch of the opposite end via two different IP channels. The strategy 2 identifies the failure of the first sub-route by the soft switch of the local end, and answers the call to the soft switch of the opposite end via the second sub-route directly.

The secure intercommunication solutions in the prior art can prevent the problem of service interruption caused by the failure of the route between soft switches. In particular, in the above prior art, when the soft switch detects that the first sub-routes are unavailable via the hardware and protocol of the local end, it does not select the sub-routes during a call, and transfers the call directly via the second sub-route. However, the deficiency of the above prior art lies in failing to consider the situation of service interruption caused by the failure of the TMG of a soft switch or the full blocking of office-directed tails occurring at the opposite end. Therefore, when the failure of the TMG of a soft switch or the full blocking of office-directed trunks occurs at the opposite end, since the soft switches will continue to transfer the call in the selected sub-route, the complete interruption of services between large districts may occur in the first-class toll network constituted by soft switches. To be brief, in the soft switch networks of the prior art only the situation of the route failure between soft switches is considered, whereas the situation of the route failure at the soft switch of the opposite end is not taken into account.

Consequently, there is a need for a security protection method and apparatus for performing security protection during service interruption occurring in a switch network which can prevent the occurrence of the complete interruption of services between large districts in a first-class toll network constituted by soft switches when the failure of the TMG of a soft switch or the full blocking of office-directed bunks occurs at the opposite end.

SUMMARY OF THE INVENTION

Embodiments of the present invention provide a method and apparatus for security protection of service interruption occurring in a switch network, which can prevent the occurrence of the complete interruption of services between large districts in a first-class toll network constituted by soft switches when the failure of the TMG of a soft switch or the full blocking of office-directed trunks occurs at the opposite end.

According to an embodiment of the present invention, there is provided a security protection method for security protection during service interruption occurring in a switch network, including: selecting, by a transmitting-end device, a sub-route from a plurality of sub-routes and transmitting a call to an opposite-end device via a trunk device; analyzing, by the trunk device, a route condition from the current selected sub-route to the opposite-end device, when the call is received; determining, by the trunk device, to transmit the call to the opposite-end device according to the route condition, when the route condition is normal; otherwise, reporting a blocking message to the transmitting-end device; excluding, by the transmitting-end device, the current selected sub-route, when the transmitting-end device receives a blocking message; and selecting a next sub-route to initiate the call, when not all sub-routes are excluded; otherwise, ending selecting the sub-routes.

According to an embodiment of the present invention, there is provided a security protection apparatus for security protection during service interruption occurring in a switch network which includes a transmitting-end device, an opposite-end device, and a trunk device; the security protection apparatus including: a transmitting module for enabling the transmitting-end device to select each sub-route from a plurality of sub-routes one by one to transmit a call to an opposite-end device; an analyzing module for enabling the trunk device to analyze a route condition from the current selected sub-route to the opposite-end device when the call is received; a forwarding and reporting module for enabling the trunk device to determine whether to transit the call to the opposite-end device or report a blocking message to the transmitting-end device according to the route condition; and a processing module for enabling the transmitting-end device to exclude the current selected sub-route and judge whether all the sub-routes are excluded, and determine whether to continue executing the process of the transmitting module or end selecting the sub-routes based on the judgment result if the transmitting-end device receives the blocking message.

According to an embodiment of the present invention, there is provided a trunk device, including:

a circuit management module for analyzing a route condition from a current sub-route selected by a transmitting-end device to an opposite-end device when a call from the transmitting-end device is received;

a call control module for generating a release reason when the route condition is abnormal; and a processing module for reporting a blocking message carrying the release reason generated by the call control module to the transmitting-end device.

According to an embodiment of the present invention, there is provided a soft switch including:

a circuit management nodule for selecting a sub-route from a plurality of sub-routes when initiating a call;

a processing module for transmitting a release message when receiving a blocking message from a trunk device; and a call control module for reselecting a route for the call when receiving the release message, and taking a current sub-route as the sub-route to transmit a route selection request to the circuit management module.

In the embodiments of the present invention, the route condition from the current selected sub-route to the opposite-end device is analyzed by the trunk device, and it is determined whether to select a next sub-route according to the route condition so as to ensure effectively the service not to be interrupted during the failure of the trunk device of the destination soft switch or the full blocking of office-directed trunk circuits. As compared with the equipment redundancy backup solution (a soft switch being configured with a plurality of trunk devices, each of which shares service; this manner is referred to as equipment redundancy solution, and this solution is costly), the solution according to the embodiments of the present invention is cheaper and highly reliable.

BRIEF DESCRIPTIONS OF THE DRAWINGS

The figures described herein are used to provide fierier understanding of the present invention and constitute a part of the present application, and the illustrative embodiments and the corresponding descriptions of the present invention are used to explain the present invention rather than constituting any improper limitation to the present invention. In the figures.

DETAILED DESCRIPTIONS OF THE EMBODIMENTS

When a route failure between soft switches causes a failure of a TMG of a soft switch or a full blocking of office-directed trunks at an opposite end, since soft switch networks in the prior art do not detect the route condition of the opposite end, but select a sub-route directly, the complete interruption of services between large districts may occur in a first-class toll network constituted by soft switches. According to embodiments of the present invention, in order to avoid such situation, when a transmitting-end device selects a sub-route, it will require to detect the route condition of an opposite end and select a proper route according to the detected condition so as to avoid the complete interruption of services between large districts in a first-class toll network constituted by soft switches.

Figure 1:
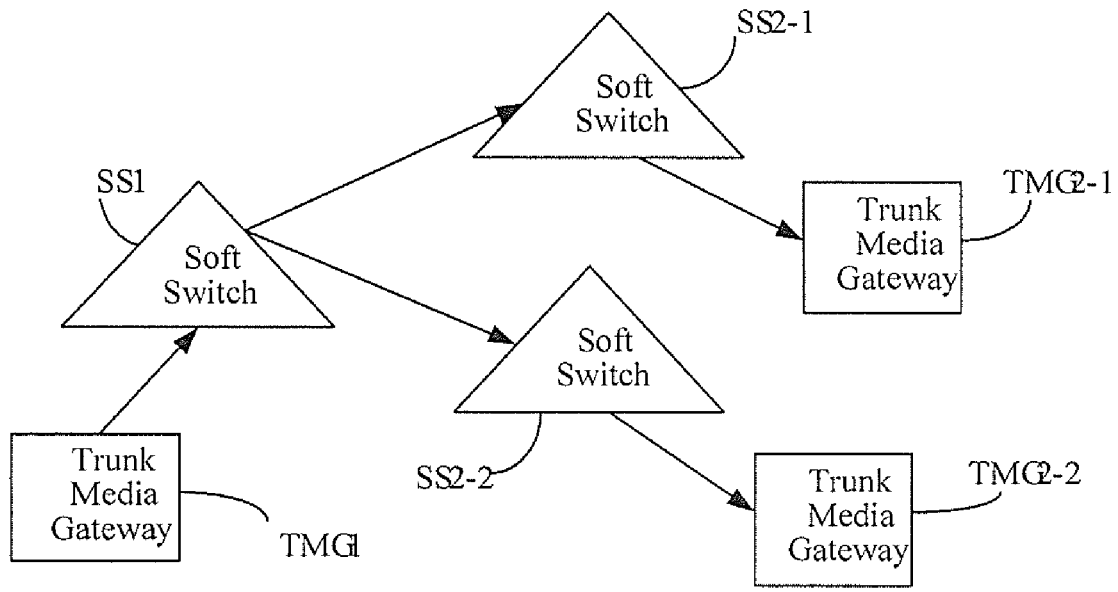
FIG. 1 shows a network topological graph of a first-class toll network constituted by soft switches in the prior art.
Figure 2:
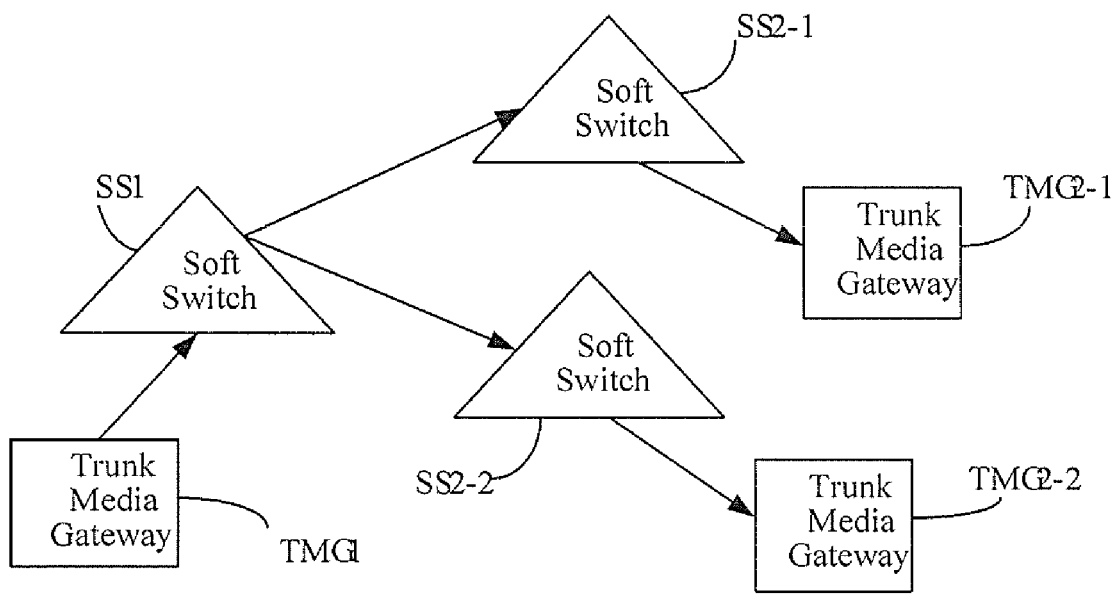
FIG. 2 shows a network topological graph of another first-class toll network constituted by soft switches in the prior art.
Figure 3:
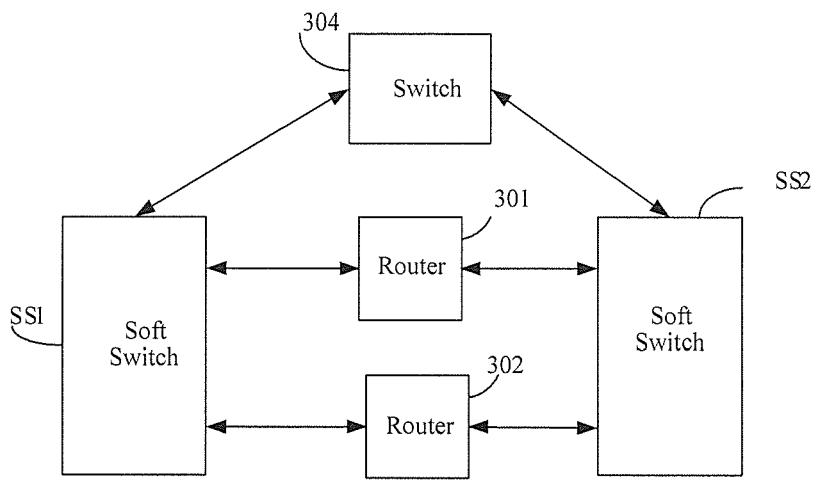
FIG. 3 shows a secure intercommunication solution between soft switches in the prior art.
Figure 4:
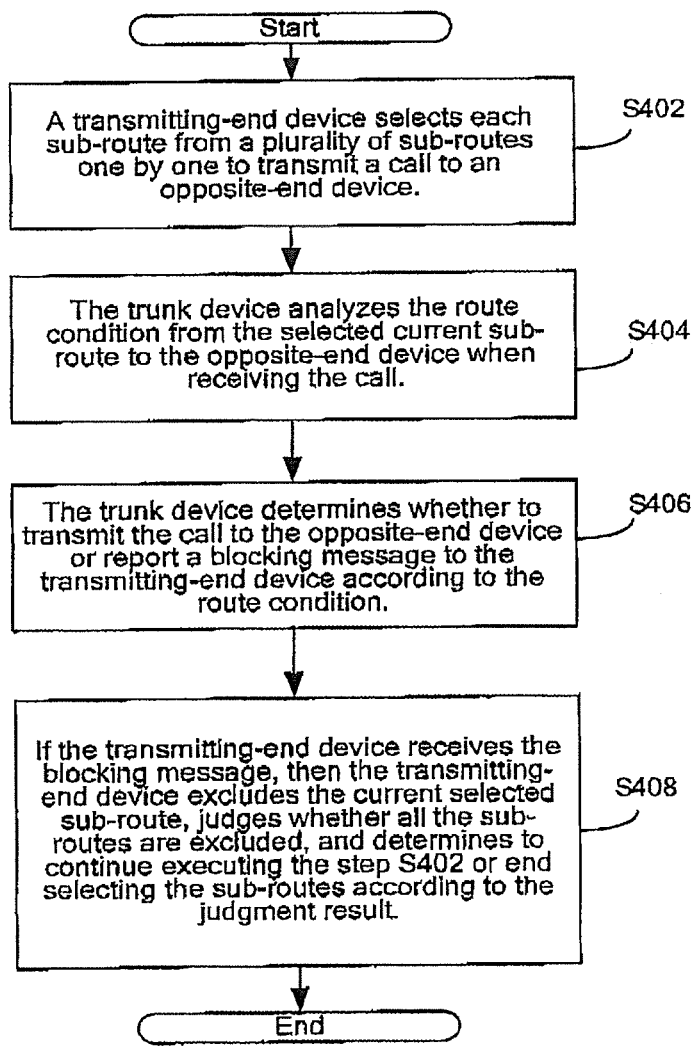
FIG. 4 shows a flow chart of a security protection method according to an embodiment of the present invention.

In particular, a security protection method according to an embodiment of the present invention is illustrated in FIG. 4, and includes the following steps:

in step S402, a transmitting-end device selects each sub-route from a plurality of sub-routes one by one to transmit a call to an opposite-end device;

in step S404, a trunk device analyzes a route condition from the current selected sub-route to the opposite-end device when receiving the call;

in step S406, the trunk device determines whether to transmit the call to the opposite-end device or report a blocking message to the transmitting-end device according to the route condition; and in step S408, if the transmitting-end device receives a blocking message, then the transmitting-end device excludes the current selected sub-route, and judges whether all the sub-routes are excluded, and determines whether to continue executing step S402 or end selecting the sub-routes according to the judgment result.

Figure 5:
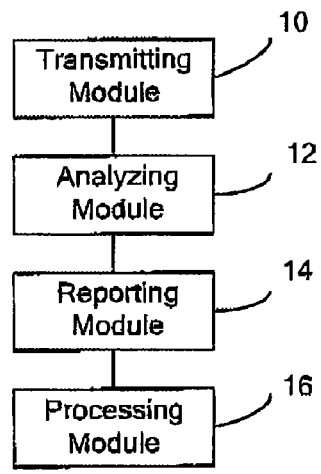
FIG. 5 shows a block diagram of a security protection apparatus according to an embodiment of the present invention.

In particular, a security protection apparatus 100 according to an embodiment of the present invention is illustrated in FIG. 5, and includes:

a transmitting module 10 for enabling a transmitting-end device to select each sub-route from a plurality of sub-routes one by one to transmit a call to an opposite-end device;

an analyzing module 12 for enabling the trunk device to analyze the route condition from the current selected sub-route to the opposite-end device when receiving the call;

a forwarding and reporting module 14 for enabling the trunk device to determine whether to transmit the call to the opposite-end device or report a blocking message to the transmitting-end device according to the route condition; and a processing module 16 for enabling the transmitting-end device to exclude the current selected sub-route, and judge whether all the sub-routes are excluded, mid determine whether to continue executing the process of the transmitting module 10 or end selecting sub-routes based on the judgment result, if the transmitting-end device receives the blocking message.

The transmitting module 10 and the processing module 16 can be ranged in the transmitting-end device, and the analyzing module 12 and forwarding and reporting module 14 can be arranged in the trunk device.

Figure 6:
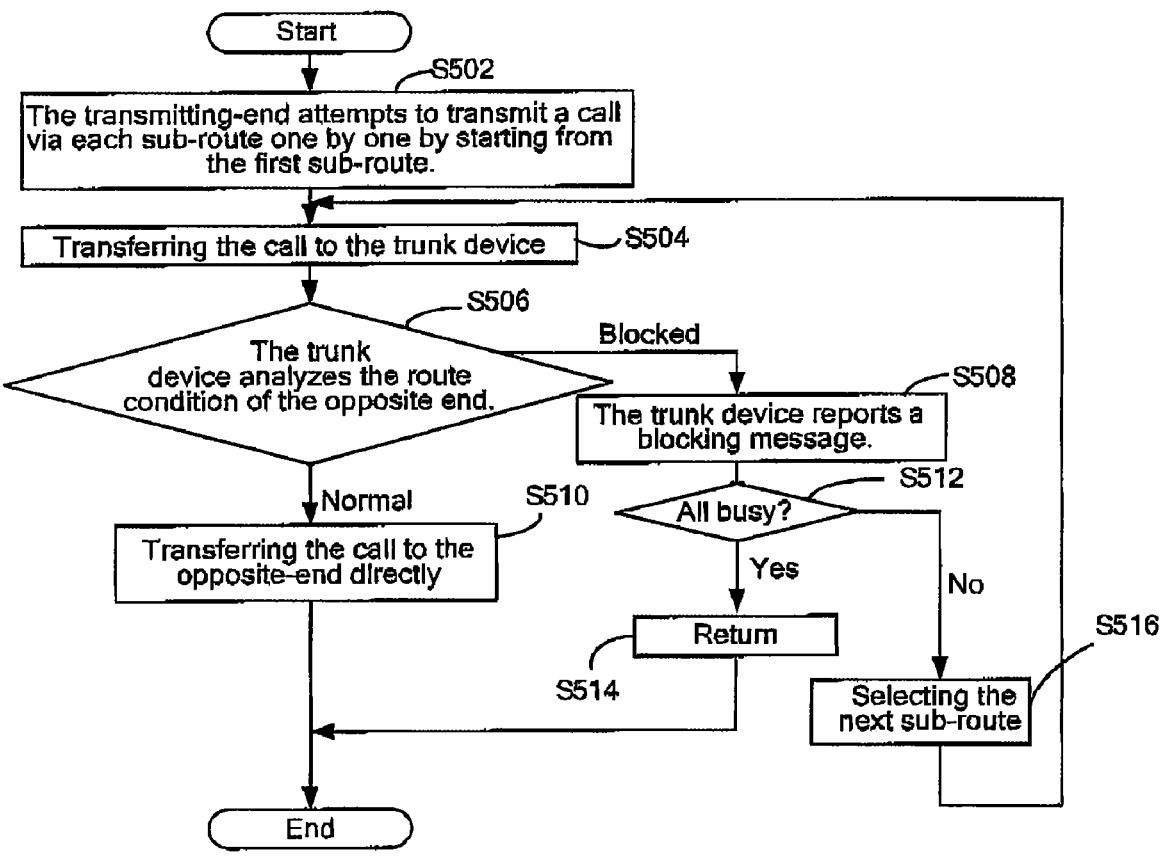
FIG. 6 shows a flow chart of a security protection method for SS service interruption according to an embodiment of the present invention.

FIG. 6 shows a flow chart of a security protection method for SS service interruption according to an embodiment of the present invention.

In step S502, a transmitting-end device attempts to transmit a call via each sub-route by starling from the first sub-route;

in step S504, the transmitting-end device transfers the call to a trunk device;

in step S506, the trunk device analyzes the route condition of an opposite end, if it is normal, then the process proceeds to step S510, and if the route of the opposite end is blocked, then the process proceeds to step S508;

in step S508, the trunk device reports a blocking message to the transmitting-end device and then the process proceeds to step S512;

in step S510, the trunk device directly forwards the call to the opposite end;

in step S512, it is judged whether the sub-routes are all busy, that is, whether all the sub-routes are blocked, if Yes, then the process proceeds to step S514, and if No, ten the process proceeds to step S516;

in step S514, the transmitting-end device returns an all-busy message and ends selecting the sub-routes; and in step S516, the transmitting-end device selects a next sub-route to be polled and then the process returns to step S504.

Figure 7:
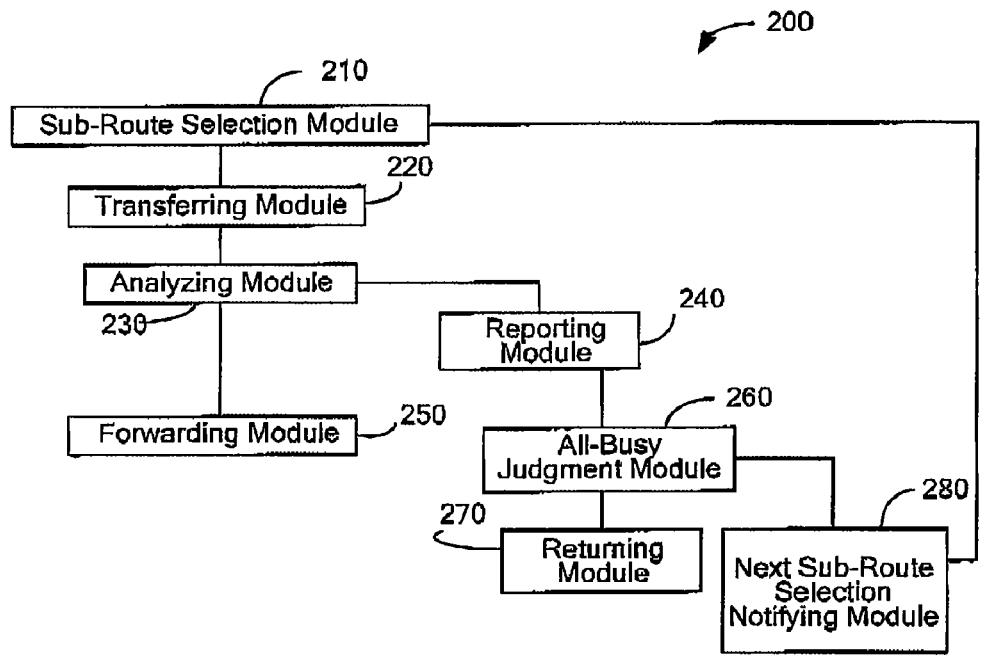
FIG. 7 shows a block diagram of a security protection apparatus for SS service interruption according to an embodiment of the present invention.

FIG. 7 shows a block diagram of a security protection apparatus for SS service interruption according to an embodiment of the present invention.

The security protection apparatus 200 includes:

a sub-route selection module 210 for enabling the transmitting-end device to attempt to transmit a call via each sub-route by starting from die first sub-route;

a transferring module 220 for enabling the transmitting-end device to transfer the call to the trunk device;

an analyzing module 230 for enabling the trunk device to analyze the route condition of the opposite end, if it is normal, then execute a process of a forwarding module 250, and if the route of the opposite end is blocked, then execute a process of a reporting module 240;

a reporting module 240 for enabling the trunk device to report a blocking message to the transmitting-end device, and then execute a process of an all-busy judgment module 260;

a forwarding module 250 for enabling the trunk device to directly forward the call to the opposite end;

an all-busy judgment module 260 for enabling the transmitting-end device to judge whether the sub-routes are all busy, that is, whether all the sub-routes are blocked, if Yes, then execute a process of a returning module 270, and if No, then execute a process of a next sub-route selection notifying module 280;

a returning module 270 for enabling the transmitting-end to return the all-busy message and end selecting the sub-routes; and a next sub-route selection notifying module 280 for notifying the sub-route selection module 210 to select a next sub-route to be polled.

The sub-route selection module 210 and the transferring module 220 can be arranged in the transmitting module 10, the reporting module 240 and the forwarding module 250 can be arranged in the forwarding and reporting module 14, and the all-busy judgment module 260, the returning module 270, and the next sub-route selection notifying module 280 can be arranged in the processing module 16.

The following will illustratively describe the security protection solutions during the failure of a TMG or the full blocking of office-directed trunk circuits in two cases respectively by means of embodiments.

Figure 8:
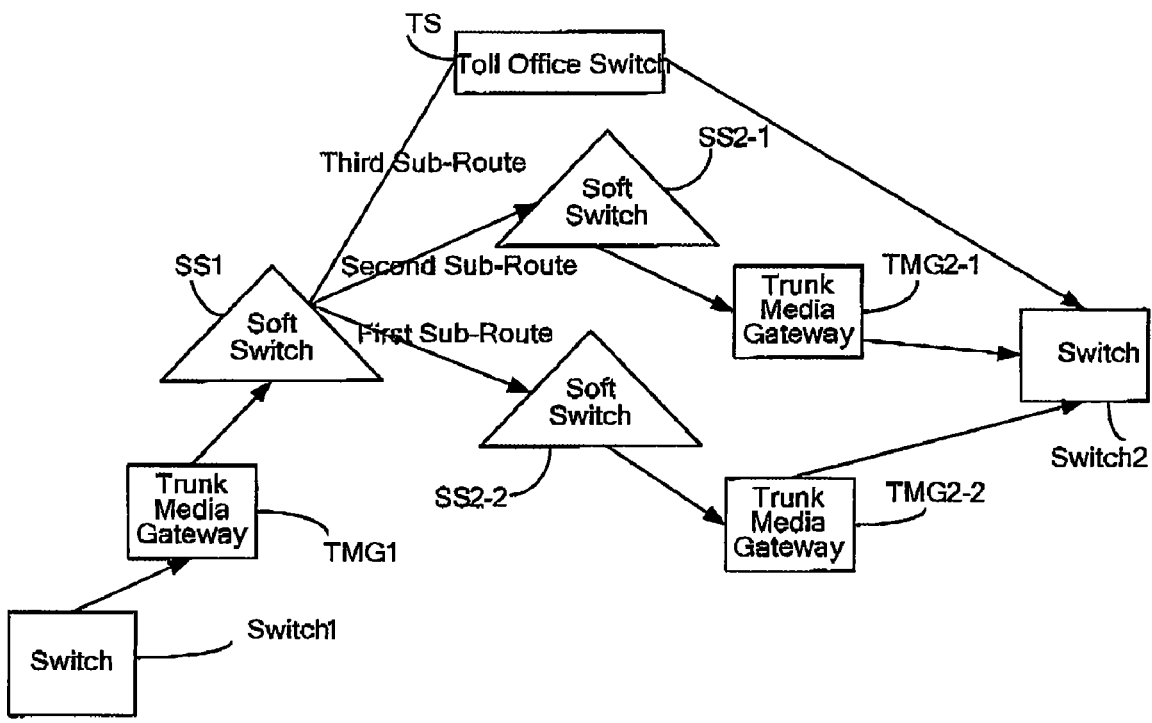
FIG. 8 shows a topological graph of a networking of destination soft switches according to an embodiment of the present invention.

FIG. 8 shows a topological graph of a networking of destination soft switches.

In this network, the toll office switch TS and the soft switch SS1 in the toll network are interconnected by ISUP (ISDN User Part, Integrated Service Digital Network User Part).

A subscriber of the calling switch Switch 1 initiating a call calls a subscriber of the destination switch Switch 2, when the soft switch SS1 receives the call, it firstly selects the first sub-route to the soft switch SS2-1 by number analyzing and route analyzing; the circuit management module (not shown in the figure) of the soft switch SS2-1 detects the failure of the bunk media gateway TMG 2-1 to which it belongs or the full blocking of the trunk circuits from the trunk media gateway TMG 2-1 to the office-directed switch, i.e. the destination switch Switch 2; the circuit management module notifies the call control module of the soft switch SS2-1 of the reason for the failure of the trunk device or the full blocking of the office-directed trunk circuits; the call control module converts the failure of the trunk device, i.e. the failure of the TMG into a release reason not adopted by the ITUT (International Telecommunication Union-Telecommunication standardization sector), e.g. 0XAD (173 in decimal), and converts the full blocking of the office-directed trunk circuits into a release reason not adopted by file ITUT, e.g. 0XAE (174 in decimal).

The first embodiment: when the soft switch SS1 and the soft switches SS2-1 and SS2-2 are interconnected via SIP (Session Initiation Protocol), the solution according to the first embodiment of the present invention includes:

When the soft switch SS1 and the soft switches SS2-1 and SS2-2 are interconnected via SIP trunk the SIP processing module of the soft switch SS2-1 converts a specific release reason value (e.g. 0XAD or 0XAE) of the call control module into an SIP state code 503 when receiving the specific release reason value, and then the soft switch SS2-1 transmits a message 503 to the soft switch SS1, the message header field of the message 503 containing the above specific release reason value (e.g. 0XAD or 0XAE).

After the soft switch SS1 receives the message 503, the SIP processing module of the soft switch SS1 transmits a Release message to the call control module of the soft switch SS1, the call control module performs processing according to the received specific release reason value (e.g. 0XAD or 0XAE), if failure processing and route reselecting are configured on the soft switch SS1 with respect to the two specific release reason values, then the call control module of the soft switch SS1 performs route reselection for tee call and transmits a route selection request to the circuit management module of the soft switch SS1 by taking the first sub-route which has been selected last time as the excluded sub-route (ESR), the circuit management module excludes the sub-route (i.e. the first sub-route) and selects the second sub-route to transmits the call to the soft switch SS2-2.

If the failure of the trunk media gateway TMG 2-2 to which the soft switch SS2-2 belongs or the full blocking of the trunk circuits to the office-directed switch Switch 2 occurs, then the processing of the soft switch SS2-2 and the processing of the soft switch SS2-1 are the same. If the circuit is normal, then the call is transmitted to the switch Switch 2 of the destination office.

When the soft switch SS1 receives the SIP message 503 of the soft switch SS2-2 and the release reason contained in the header field of the message is the specific release reason value, the soft switch SS1 transmits a route selection request to the circuit management module by taking the first sub-route and the second sub-route which have been selected as the ESRs, the circuit management module excludes the sub-routes (i.e. the first and second sub-routes) and selects the third sub-route to transmit the call to the toll office switch TS.

If the toll office switch TS has an idle circuit, then the toll office switch IS transits the call to the destination office; and if the circuits of the toll office switch TS are all busy, the toll office switch TS transmits a Release message to the soft switch SS1, and the soft switch SS1 releases the call after receiving the Release message and does not reselect any route.

Figure 9:
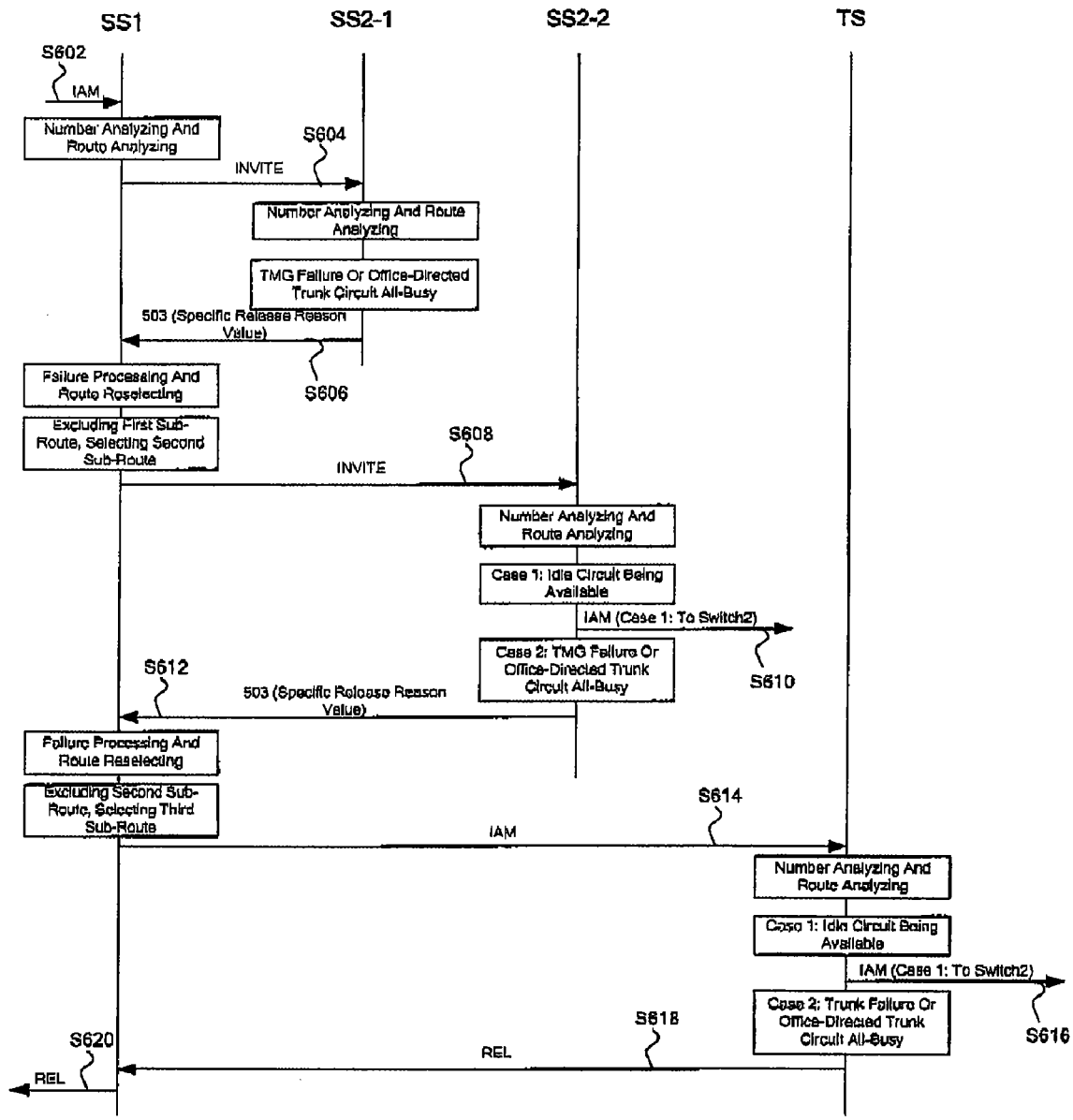
FIG. 9 shows a message flow chart based on the solution of a first embodiment of the present invention with respect to the situation in FIG. 8.

Refer to FIG. 9 for message flow. FIG. 9 shows a message flow chart of the solution according to the first embodiment of the present invention. The specific release reason value may not be limited to 0XAD and 0XAE as long as it is not adopted by the ITUT. The particular flow includes the following steps:

in S602, the SS1 receives an LAM (Initial Address Message) forwarded by the TMG 1;

in S604, the SS1 transmits a trunk interconnection request INVITE to the SS2-1 based on number analyzing and route analyzing;

in S606, the SS2-1 converts the specific release reason value (e.g. 0XAD or 0XAE) of the call control module received by the SIP processing module of the SS2-1 into an SIP state code 503 based on number analyzing and route analyzing when the TMG fails or the office-directed trunk circuits are all busy, and then the SS2-1 transmits a message 503 to the SS1;

in S608, after the SS1 receives the message 503, the SIP processing module transmits a Release message to the call control module, the call control module performs processing according to the received specific release reason value (e.g. 0XAD or 0XAE), if failure processing and route reselecting is configured on the SS1 with respect to the two specific release reason values, then the call control module of the SS1 performs route reselection for the call, and transmits a route selection request to file circuit management module by taking the first sub-route which has been selected last the as the ESR, the circuit management module excludes the ESR (i.e. the first sub-route) and selects the second sub-route to transmit the call to the soft switch SS2-2;

in S610, if the circuit is normal, then the SS2-2 transmits the call to the destination office Switch 2;

in S612, if the failure of the TMG 2-2 to which the SS2-2 belongs or the full blocking of the trunk circuits in die office-detected Switch 2, then the processing of the SS2-2 and the processing of the SS2-1 are the same;

in S614, when the SS1 receives the SIP message 503 of the SS2-2 and the release reason contained in the header field of the message is the specific release reason value, the SS1 transmits a route selection request to the circuit management module by taking the first sub-route and the second sub-route which have been selected as the ESRs, the circuit management module excludes the ESRs (i.e. the first and second sub-routes) and selects the third sub-route to transmit the call to the TS.

in S616, if the TS has an idle circuit, then the TS transmits the call to the destination office Switch 2;

in S618, if the TS circuits are all busy, the TS transmits a Release message to the SS1; and in S620, the SS1 releases the call after receiving the Release message and does not reselect any route.

The second embodiment: the soft switch SS1 and the soft switches SS2-1 and SS2-2 are interconnected via ISUP, the solution according to the second embodiment of the present invention includes:

When the soft switch SS1 and the soft switches SS2-1 and SS2-2 are interconnected via ISUP, the ISUP processing module of the soft switch SS2-1 transmits a Release message to the soft switch SS1 when receiving a specific release reason value (e.g. 0XAD or 0XAE) of the call control module, the release reason being the specific release reason value.

After the soft switch SS1 receives the Release message, the ISUP processing module of the soft switch SS1 transmits a Release message to the call control module of the soft switch SS1, the call control module performs processing according to the received specific release reason value (e.g. 0XAD or 0XAE), if failure processing and route reselecting are configured on the soft switch SS1 with respect to the two specific release reason values, then the can control module of the soft switch SS1 performs route reselection for the call, and transmits a route selection request to the circuit management module of the soft switch SS1 by taking the first sub-route which has been selected last time as the ESR, the circuit management module excludes the ESR (i.e. the first sub-route) and selects the second sub-route to transmits the call to the soft switch SS2-2.

If the soft switch SS2-2 has an idle circuit available for service bearing, then the soft switch SS2-2 transmits the call to the destination office switch Switch 2. If the failure of the trunk media gateway TMG 2-2 to which the soft switch SS2-2 belongs or the full blocking of the trunk circuits to the office-directed switch Switch 2 occurs, the processing of the soft switch SS2-2 and the processing of the soft switch SS2-1 are the same.

When the soft switch SS1 receives the Release message of the soft switch SS2-2 and the release reason is the specific release reason value, the soft switch 551 transmits a route selection request to the circuit management module by taking the first sub-route and the second sub-route which have bee selected as the ESRs, the circuit management module excludes the ESRs (i.e. the first and second sub-routes) and selects the third sub-route to transmit the call to the toll office switch TS.

If the toll office switch TS has an idle circuit, then the toll office switch TS transmits the call to the destination office; and if the circuits of the toll office switch. TS are all busy, the toll office switch TS transmits a Release message to the soft switch SS1, and the soft switch SS1 releases the call after receiving the Release message and does not reselect any route.

Figure 10:
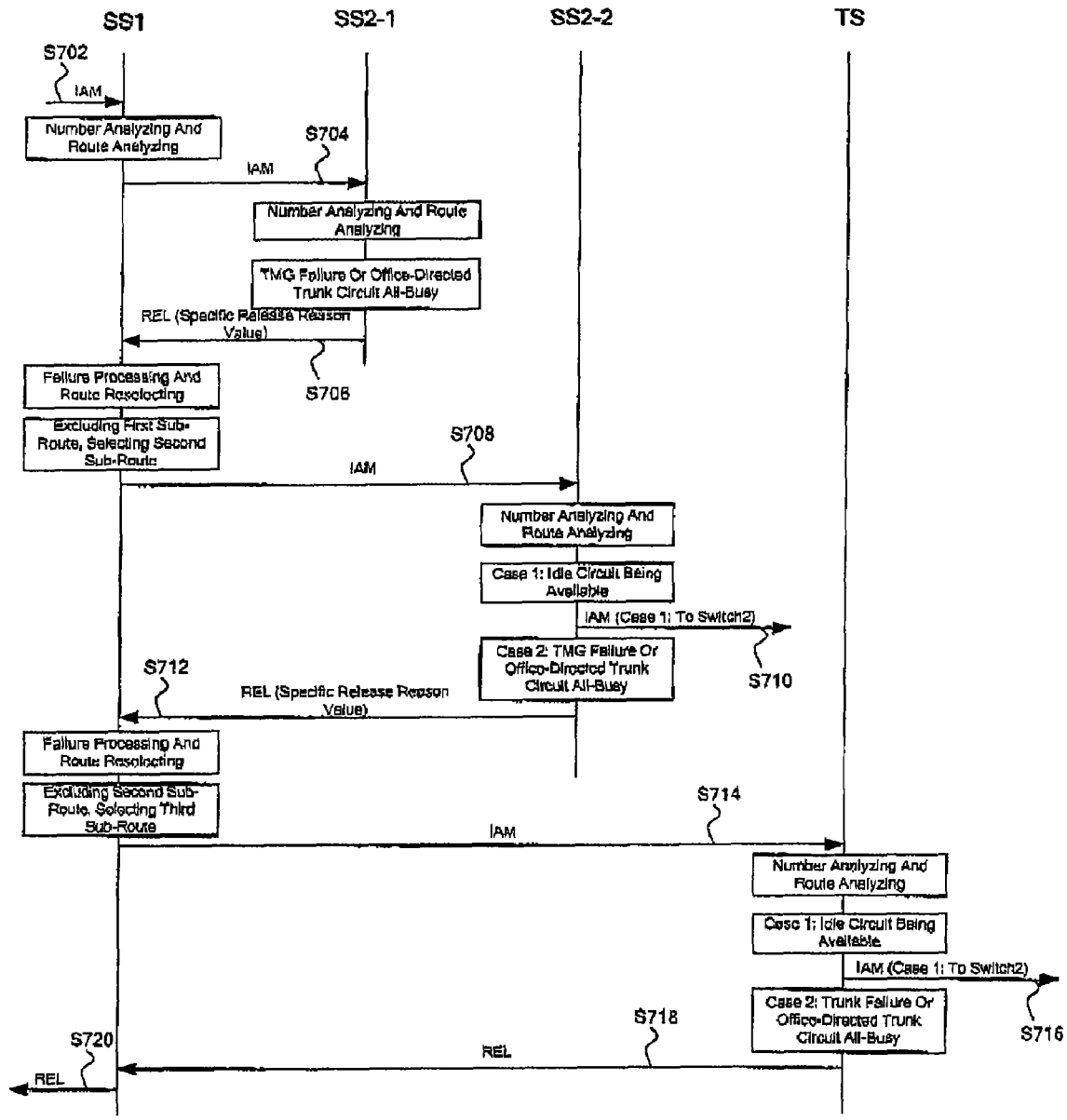
FIG. 10 shows a message flow chart based on the solution of a second embodiment of the present invention with respect to the situation in FIG. 8.

Refer to FIG. 10 for message flow. FIG. 10 shows a message flow chart of the solution according to the second embodiment of lie present invention. The specific release reason value may not be limited to 0XAD and 0XAE as long as it is not adopted by the ITUT. The detailed flow includes:

in S702, the SS1 receives an IAM forwarded by the TMG 1;

in S704, the SS1 transmits the IAM to the SS2-1 based on number analyzing and route analyzing;

in S706, the ISUP processing module of the SS2-1 transmits a Release message to the SS1 when receiving a specific release reason value (e.g. 0XAD or 0XAE) of the call control module, the release reason being the specific release reason value;

in S708, after the SS1 receives the Release message, the ISUP processing module transmits a Release message to the call control module, the call control module performs processing according to the received specific release reason value (e.g. 0XAD or 0XAE), if failure processing and route reselecting is configured on the SS1 with respect to the two specific release reason values, then the call control module of the SS1 performs route reselection for the call, and transmits a route selection request to the circuit management module by taking the first sub-route which has been selected last time as the ESR, the circuit management module excludes the ESR (i.e. the first sub-route) and selects the second sub-route to transmit the call to the soft switch SS2-2;

in S710, if the SS2-2 has an idle circuit available for service bearing, then the SS2-2 transmits the call to the destination office Switch 2;

in S712, if the failure of the TMG 2-2 to which the SS2-2 belongs or the full blocking of the trunk circuits to the office-directed Switch 2 occurs, then the processing of the SS2-2 and the processing of the SS2-1 are the same;

in S714, when the SS1 receives the Release message of the SS2-2 and the release reason is the specific release reason value, the SS1 transmits a route selection request to the circuit management module by taking the first sub-route and the second sub-route which have been selected as the ESRs, the circuit management module excludes the ESRs (i.e. the first and second sub-routes) and selects the third sub-route to transmit the call to the TS.

in S716, if the TS has an idle circuit then the TS transmits the call to the destination office;

in S718, if the TS circuits are all busy, the TS transmits a Release message to the SS1; and in S720, the SS1 releases the call after receiving the Release message and does not reselect any route.

The third embodiment: when the SS1 and the SS2-1 are interconnected via SIP whereas the SS1 and the SS2-2 are interconnected via ISUP, or when the SS1 and the SS2-1 are interconnected via ISUP whereas the SS1 and the SS2-2 are interconnected via SIP, the networking is a combination of the previous two embodiments. Therefore, the processing way is only an intersection of those in the previous two networkings. The particular processing flow may refer to the previous descriptions on FIG. 9 and FIG. 10 and will not be described again here.

Figure 11:
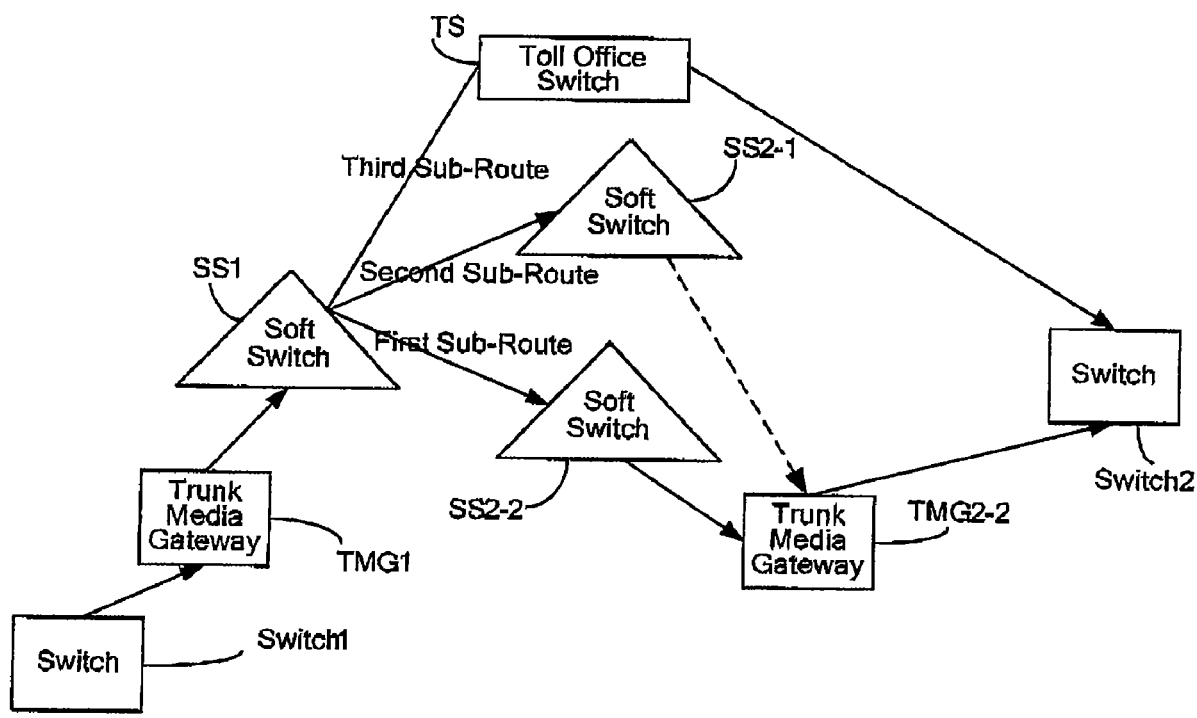
FIG. 11 shows a topological growth of another networking of destination soft switches according to an embodiment of the present invention.

FIG. 11 shows another networking dug the failure of the TMG of the destination soft switch or the full blocking of the office-directed trunk circuits.

Obviously, the processing flow in such case is the same as that of the first networking. For the purpose of conciseness, it will not be described again here.

The third networking is the networking where the number of the trunk device(s) to which the soft switches SS2-1 and SS2-2 belong may exceed 1.

Please refer to FIG. 8 for the networking diagram in this case, but there may be a plurality of trunk devices under a soft switch.

The processing flow in such case is the same as that of the first networking. For the purpose of conciseness, it is not described again here.

Figure 12:
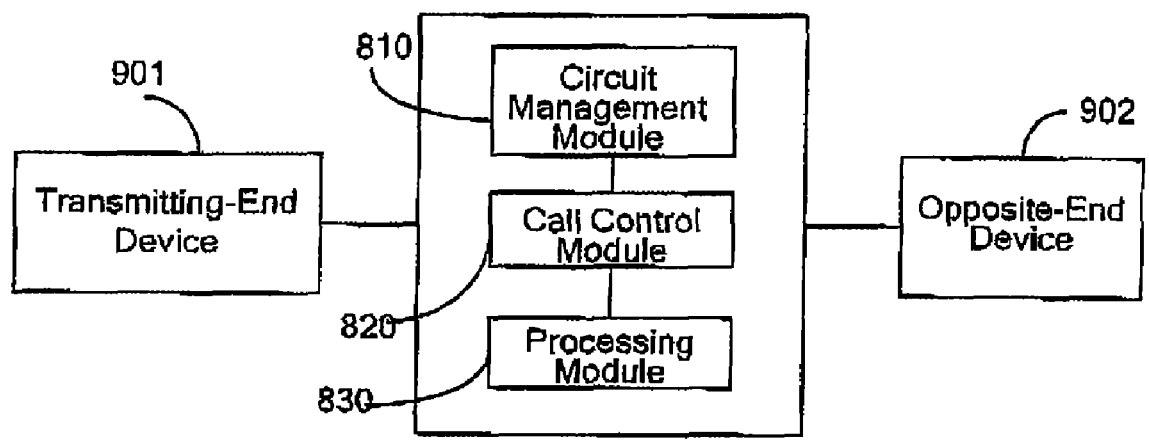
FIG. 12 is a block diagram of the main constituting structure of a trunk device according to an embodiment of the present invention.

Please refer to FIG. 12, which is a block diagram of the main constituting structure of a trunk device according to an embodiment of the present invention.

The trunk device according to the embodiment of the present invention includes: a circuit management module 810 for analyzing the route condition from the current sub-route selected by the transmitting-end device 901 to the opposite-end device 902 when receiving a call from the transmitting-end device; a call control module 820 for generating a release reason when the route condition is abnormal; and a processing module 830 for carrying the release reason generated by the call control module 820 in a blocking message so as to be reported to the transmitting-end device 901.

In a particular implementation of the trunk device according to the embodiment of the present invention, the processing module 830 is an SIP processing module, and the blocking message is an SIP message.

In another particular implementation of the trunk device according to the embodiment of the present invention, the processing module 830 is an ISUP processing module, and the blocking message is an ISUP message.

Figure 13:
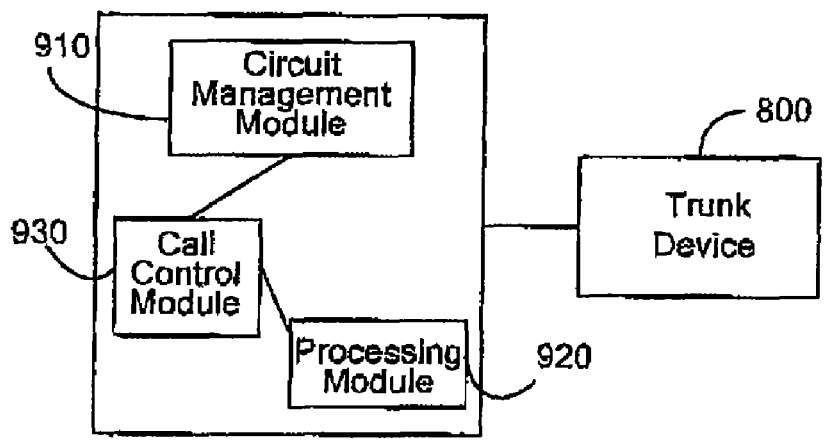
FIG. 13 is a block diagram of the main constituting structure of a soft switch according to an embodiment of the present invention.

Please refer to FIG. 13, which is a block diagram of the main constituting structure of a soft switch according to an embodiment of the present invention.

The soft switch according to the embodiment of the present invention includes: a circuit management module 910 for selecting one sub-route from a plurality of sub-routes when initiating a call; a processing module 920 for transmitting a release message when receiving a blocking message from the trunk device 800; a call control module 930 for reselecting a route for the call when receiving the release message, and taking the current sub-route as the sub-route to transmit a route selection request to the circuit management module 910.

In a particular implementation of the trunk device according to the embodiment of the present invention, the processing module 920 may be an SIP processing module or an ISUP processing module.

To summarize, embodiments of the present invention have realized the technical effects as follows: the service is effectively ensured not to be interrupted during the failure of the trunk device of the destination soft switch or the full blocking of office-directed trunk circuits, and as compared with the equipment redundancy backup solution (a soft switch being configured with a plurality of trunk devices, each of which shares service; the manner is referring to equipment redundancy solution, and the solution is costly), the solution of the embodiments is cheaper and highly reliable.

The above principle of the present invention can be utilized in a soft switch network as well as all the other switch networks.

The above description is only preferred embodiments of the present invention and should not be intended to limit the present invention. Those skilled in the art can make various modifications and variations to the present invention. Any modification, equivalent substitution improvement etc. made within the spirit and principle of the present invention should be encompassed in the protection scope of the present invention

What is claimed is:

1. A security protection method for performing security protection during service interruption occurring in a switch network, comprising:
    selecting, by a transmitting-end device, a sub-route from a plurality of sub-routes and transmitting a call to an opposite-end device via a trunk device;
    analyzing, by the trunk device, a route condition from the current selected sub-route to the opposite-end device when the call is received;
    transmitting, by the trunk device, the call to the opposite-end device according to the route condition when the route condition is normal; otherwise, reporting a blocking message to the transmitting-end device; and
    excluding, by the transmitting-end device, the current selected sub-route when the transmitting-end device receives the blocking message, selecting a next sub-route to initiate the call when not all sub-routes are excluded; otherwise, ending selecting the sub-routes.

2. The security protection method according to claim 1, wherein the analyzing comprises at least one of number analyzing and route analyzing.

3. The security protection method according to claim 1, wherein reporting a blocking message comprises transmitting an SIP (Session Initiation Protocol) message carrying a release reason to the transmitting-end device.

4. The security protection method according to claim 1, wherein reporting a blocking message comprises transmitting an ISUP (Integrated Service digital network User Part) message carrying a release reason to the transmitting-end device.

5. The security protection method according to claim 3, wherein the release reason comprises at least one of the failure of a trunk media gateway of a receiving-end switch and the full blocking of office-directed trunk circuits of the receiving-end switch.

6. The security protection method according to claim 4, wherein the release reason comprises at least one of the failure of a trunk media gateway of a receiving-end switch and the full blocking of office-directed trunk circuits of the receiving-end switch.

7. The security protection method according to claim 1, wherein the analyzing is performed by a circuit management module of the trunk device; and reporting a blocking message comprises: notifying a call control module of the trunk device to generate a release reason when the route condition is abnormal, and transmitting a Session Initiation Protocol (SIP) message carrying the release reason by an SIP processing module of the trunk device.

8. The security protection method according to claim 1, wherein the analyzing is performed by a circuit management module of the trunk device; and reporting a blocking message comprises: notifying a call control module of the trunk device to generate a release reason when the route condition is abnormal, and transmitting an Integrated Service digital network User Part (ISUP) message carrying the release reason by an ISUP processing module of the trunk device.

9. The security protection method according to claim 1, wherein the switch network comprises a soft switch network.

10. The security protection method according to claim 9, wherein the transmitting-end device comprises a soft switch.

11. The security protection method according to claim 9, wherein the trunk device comprises a soft switch.

12. The security protection method according to claim 1, wherein the trunk device comprises a trunk media gateway.

13. A security protection apparatus for performing security protection during service interruption occurring in a switch network which comprises a transmitting-end device, an opposite-end device and a trunk device, the security protection apparatus comprising:
    a transmitting module for enabling the transmitting-end device to select each sub-route from a plurality of sub-routes one by one to transmit a call to the opposite-end device;
    an analyzing module for enabling the trunk device to analyze a route condition from the current selected sub-route to the opposite-end device when receiving the call;
    a forwarding and reporting module for enabling the trunk device to determine whether to transmit the call to the opposite-end device or report a blocking message to the transmitting-end device according to the route condition; and
    a processing module for enabling the transmitting-end device to exclude the current selected sub-route, judge whether all the sub-routes are excluded, and determine whether to continue executing the process of the transmitting module or end selecting the sub-routes based on the judgment result, if the trunk device reports the blocking message to the transmitting-end device.

14. The security protection apparatus according to claim 13, wherein the transmitting module comprises:
    a sub-route selection module for enabling the transmitting-end device to attempt to transmit a call via each sub-route by starting from the first sub-route;
    a transferring module for enabling the transmitting-end device to use the selected sub-route to transfer the call to the trunk device.

15. The security protection apparatus according to claim 14, wherein the processing module comprises:
    an all-busy judgment module for enabling the transmitting-end device to judge whether the sub-routes are all busy;
    a returning module for enabling the transmitting-end device to return an all-busy message and end selecting the sub-routes when the all-busy judgment module judges that the sub-routes are all busy;
    a next sub-route selection notifying module for notifying the sub-route selection module to select a next sub-route to be polled when the all-busy judgment module judges that the sub-routes are not all busy.

16. The security protection apparatus according to claim 13, wherein the forwarding and reporting module comprises:
    a reporting module for enabling the trunk device to report the blocking message to the transmitting-end device when the analyzing module determines that the route condition is abnormal; and a forwarding module for enabling the trunk device to directly forward the call to the opposite-end device when the analyzing module judges that the route condition is normal.

17. A trunk device, comprising:

a circuit management module for analyzing a route condition from a current sub-route selected by a transmitting-end device to an opposite-end device when a call from the transmitting-end device is received;

a call control module for generating a release reason when the route condition is abnormal;

a processing module for reporting a blocking message carrying the release reason generated by the call control module to the transmitting-end device.

18. The trunk device according to claim 17, wherein the processing module is an SIP (Session Initiation Protocol) processing module, and the blocking message is an SIP message.

19. The trunk device according to claim 17, wherein the processing module is an ISUP (Integrated Service digital network User Part) processing module, and the blocking message is an ISUP message.

20. A soft switch, comprising:

a circuit management module for selecting a sub-route from a plurality of sub-routes when initiating a call;

a processing module for transmitting a release message when receiving a blocking message from a trunk device; and a call control module for reselecting a route for the call when receiving the release message, and taking a current sub-route as the sub-route to transmit a route selection request to the circuit management module.

21. The soft switch according to claim 20, wherein the processing module is an SIP (Session Initiation Protocol) processing module or an ISUP (Integrated Service digital network User Part) processing module.

* * * * *